United States Patent [19]

McDaniel et al.

[11] Patent Number: 4,460,756
[45] Date of Patent: Jul. 17, 1984

[54] OLEFIN POLYMERIZATION METHOD

[75] Inventors: Max P. McDaniel; John A. Sanbrano; Marvin M. Johnson, all of Bartlesville, Okla.

[73] Assignee: Phillips Petroleum Company, Bartlesville, Okla.

[21] Appl. No.: 479,238

[22] Filed: Mar. 28, 1983

Related U.S. Application Data

[62] Division of Ser. No. 250,446, Apr. 2, 1981, Pat. No. 4,397,769.

[51] Int. Cl.$^3$ .............................................. C08F 10/00
[52] U.S. Cl. .................................... 526/106; 526/100
[58] Field of Search ................................ 526/100, 106

[56] References Cited

U.S. PATENT DOCUMENTS

| | | | |
|---|---|---|---|
| 3,227,699 | 1/1966 | Rendon et al. | 526/100 |
| 3,380,934 | 4/1968 | Batzold | 252/467 X |
| 3,575,888 | 4/1971 | Long | 252/476 |
| 3,879,362 | 4/1975 | Chalfont et al. | 526/113 |
| 3,887,494 | 7/1975 | Dietz | 252/452 |
| 3,986,983 | 10/1976 | Hoff et al. | 252/428 |
| 4,041,224 | 8/1977 | Hoff et al. | 526/96 |
| 4,151,122 | 4/1979 | McDaniel et al. | 252/458 |
| 4,177,162 | 12/1979 | McDaniel et al. | 252/439 |
| 4,182,815 | 1/1980 | McDaniel et al. | 526/96 |

*Primary Examiner*—Paul R. Michl
*Assistant Examiner*—Alex H. Walker

[57] ABSTRACT

A supported chromium oxide polymerization catalyst is prepared by a process which includes the steps of heating silica-supported chromium oxide or a substance oxidizable to chromium oxide in a nonoxidizing atmosphere in the presence of formaldehyde or a compound thermally decomposable to formaldehyde, and then heating the thus-treated catalyst in an oxygen-containing atmosphere. The temperatures of the respective heating steps can vary depending upon the properties desired in the polymer to be produced with the invention catalyst; however, the invention catalyst preparation method enables the production of a catalyst having a high melt index potential at relatively low treatment temperatures, e.g. no higher than about 600° C.

18 Claims, No Drawings ously obtained titanium and an aqueous solution containing a calcined catalyst. Tion of

OLEFIN POLYMERIZATION METHOD

This is a divisional of pending application Ser. No. 250,446, filed Apr. 2, 1981, now U.S. Pat. No. 4,397,769.

BACKGROUND OF THE INVENTION

The invention relates to chromium oxide polymerization catalysts and to methods of preparing and using them.

It is known that supported chromium oxide polymerization catalysts can be used to prepare olefin polymers in a hydrocarbon solution to give a polymer having excellent physical and chemical properties. Such catalysts can also be used to prepare olefin polymers in a slurry process in which polymer is produced in the form of small particles of solid material suspended in a diluent. In such polymerization processes, control of the melt index of the polymer can be effected by varying polymerization temperature; higher reaction temperatures generally increase melt index. However, this expedient is limited in particle-form polymerization to about 110° C. in a diluent such as isobutane, as a temperature higher than this causes polymer dissolution, thus negating the purpose of the slurry process, and results in fouling of the reactor due to polymer deposition.

Another way of increasing the melt index of polymers prepared in a slurry process is by increasing the activation temperature of the catalyst. The higher the activation temperature of the catalyst, the higher the polymer melt index. However, the improvement noted is relatively small and increased catalyst activation temperature can narrow the molecular weight distribution of the polymer produced and lower its environmental stress crack resistance. Also, the method is limited by the sintering temperature of the silica-containing support, e.g. about 980°–1095° C. Thus, most polymers produced in a catalytic process represent a compromise between the melt index potential of the catalyst and catalyst activity, both increased by high catalyst activation temperature, and environmental stress crack resistance, which is favored at low catalyst activation temperatures. High activation temperatures have the additional disadvantage of increasing the cost of catalyst preparation. It is therefore desirable to find polymerization catalysts which have a high melt index capacity but do not require high activation temperatures.

SUMMARY OF THE INVENTION

According to the invention, silica-supported chromium oxide or a substance oxidizable to chromium oxide is (a) heated in the presence of a formaldehyde treating agent in the substantial absence of molecular oxygen and then (b) heated in the presence of molecular oxygen. The formaldehyde treating agent includes compounds thermally-decomposable to formaldehyde such as paraformaldehyde and the thermal decomposition products of formaldehyde. The respective temperatures of the sequential heating steps can vary depending upon the desired properties of the polymer, but the present invention permits the use of relatively low activation temperatures, i.e., about 600° C. or less, to obtain a catalyst having high melt index potential without the narrowing of molecular weight distribution often seen in polymer produced by such a catalyst.

DETAILED DESCRIPTION OF THE INVENTION

Supported chromium oxide catalysts and methods for preparing them are well known. The silica-containing substrates used in the invention catalyst comprise silica or silica-alumina gels. Such gels are conventionally prepared by mixing an acid such as sulfuric acid with an aqueous solution of an alkali metal silicate such as sodium silicate to produce an aqueous gel, or hydrogel. Silica gels often have a minor portion, generally not exceeding 20 weight percent, of alumina or other metal oxides, and the support of the invention includes composite gels comprising silica and alumina, thoria, titania, zirconia and like substances. The hydrogel is washed with water and treated by known methods to reduce the alkali metal content, and then the water in the hydrogel is removed by such methods as washing with an organic compound soluble in water, azeotropic distillation in the presence of an organic compound, or heating by a method such as spray drying, vacuum oven drying, or air-oven drying at temperatures up to about 425° C. Drying the hydrogel produces a porous silica gel which is substantially free of water, e.g. a xerogel, which can then be used as a substrate for the other components of the polymerization catalyst.

The chromium component of the catalyst comprises about 0.001 to about 10 weight percent chromium, preferably about 0.1 to about 5 weight percent, based on the weight of the calcined catalyst. The chromium can be added to the support material by any suitable method. The chromium component can be, for example, coprecipitated with the silica or added to the xerogel by means of a nonaqueous solution of a chromium compound such as tertiary-butyl chromate, but it is preferably introduced by incorporating an aqueous solution of a water-soluble compound into the hydrogel after washing the hydrogel to remove alkali metal ions. Suitable chromium compounds include chromium acetate, chromium nitrate, chromium sulfate, chromium trioxide, ammonium chromate or any other chromium compound which can be converted to chromium oxide by calcination, with at least a portion of the chromium being converted to the hexavalent state. As used herein, the term "chromium oxide," as used to describe the chromium compound present in the catalyst after calcining, includes fixed surface chromates formed by the reaction of chromium oxide and silica, as discussed in Hogan, J. Poly. Sci. A-1, 8, 2637–2652 (1970). The chromium compound is employed in an amount which will provide the desired weight percent chromium in the final catalyst.

The chromium oxide polymerization catalyst can also contain titanium. Titanium, if present, will usually be present in an amount of from about 0.1 to 20, preferably about 0.5 to 5, weight percent titanium based upon the weight of the calcined catalyst. Titanation of the support can be accomplished in any suitable manner, and a variety of methods are known in the art. All or part of the titanium can be supplied by coprecipitation of silica and titania. In the coprecipitation method, a titanium compound such as a titanium halide, nitrate, sulfate, oxalate, or alkyl titanate, for example, is incorporated with the acid or the silicate in an amount so as to produce the desired amount of titanium in the calcined catalyst.

Titanation of the silica can alternatively be effected by impregnation of the hydrogel or xerogel before or after incorporation of the chromium component of the catalyst. For example, an aqueous solution of a hydrolysis-resistant titanium compound can be incorporated into a silica hydrogel and dried by conventional techniques, preferably after incorporation of a chemical agent known to be effective in preventing shrinkage of the pores of the support. Suitable hydrolysis-resistant compounds include certain titanium chelates, particularly alkanolamine titanates such as triethanolamine titanate, which is available commercially as Tyzor-TE ®.

Titanation of the silica support can also be accomplished by adding a solution of a titanium compound to the silica xerogel, usually with heat to vaporize the solvent and cause titanium to be deposited on the support. Suitable titanium compounds for impregnation of the silica xerogel include the hydrolysis-resistant titanium chelates discussed above; titanium hydrocarbyloxides containing from 1 to about 12 carbon atoms per hydrocarbon group including titanium tetradodecyloxide, titanium tetracyclohexyloxide, and titanium tetraphenoxide; and titanium tetrahalides. Water-sensitive compounds such as titanium tetraisopropoxide are applied neat or dissolved in a nonaqueous solvent such as n-hexane. Water-tolerant compounds such as triethanolamine titanate can he applied in an aqueous or nonaqueous solvent. To incorporate the titanium into the support, the xerogel can be slurried with a nonaqueous solution or slurry of the titanium compound while heating the mixture moderately at temperatures up to about 150° C. to remove the solvent or diluent, and then activating as described below.

A combination of titanation methods can be used. For example, a coprecipitated silica-titania gel can be impregnated with a titanium compound to bring the total titanium level to a desired point.

A presently preferred chromium oxide catalyst is a cogel catalyst prepared by coprecipitation of an aqueous sodium silicate solution with sulfuric acid containing sufficient titanyl sulfate to produce a catalyst containing, after activation, about 2 to about 2.5 weight percent titanium as the dioxide. The precipitated hydrogel cogel is impregnated with sufficient aqueous chromium trioxide to provide about 1 weight percent chromium on the final activated catalyst, and the impregnated cogel is dried by azeotropic distillation with ethyl acetate.

The treating agents employed in preparing the invention catalyst include formaldehyde and compounds thermally decomposable to formaldehyde, such as linear polymers. Such linear polymers can be expressed by the formulas (a) $HO(CH_2O)_nH$ wherein n is an integer ranging from 2 to about 500 or more; (b) $CH_3COO(CH_2O)_bCOCH_3$ wherein b is an integer varying from 2 to about 200; (c) $CH_3O(CH_2O)_nCH_3$ wherein n is as previously defined; and (d) $CH_3(CH_2O)_cCH_2CH_2CH(OH)OCH_3$ wherein c is an integer of about 100 or more. Examples of compounds encompassed by (a) include paraformaldehyde, which is presently preferred, and polyoxymethylene polymers. Examples of compounds included in (b) are the polyoxymethylene diacetates; compounds included in (c) are the polyoxymethylene dimethyl ethers; and compounds included in (d) are the epsilon- and sigma-polyoxymethylene polymers. Such compounds are described, for example, in Kirk-Othmer, *Encyclopedia of Chemical Technology*, 2nd Edition, Vol. 10, pages 77-83,89. Such compounds have polymerized formaldehyde contents ranging from about 40 to near 100 weight percent and preferably from about 90 to near 100 weight percent. Small amounts, e.g. up to about 5 weight percent, of water can be tolerated in the formaldehyde compound.

The mole ratio of silica in the catalyst to formaldehyde in the treating agent can vary from about 0.1:1 to about 5:1, more preferably from about 0.5:1 to about 2:1.

The catalyst can be preheated in a nonoxidizing gas such as nitrogen or argon, and the gaseous formaldehyde treating agent can be dispersed in the nonoxidizing gas for contact with a dry fluidized catalyst or support at an elevated temperature of at least about 250° C., generally about 300° C. to about 600° C. and preferably about 500° C. to about 595° C. The treatment time will generally be a period sufficient to consume the treating agent, which can vary depending upon the amount used and its rate of introduction to the catalyst. The total time for heating the catalyst in the nonoxiding atmosphere can vary but will generally be within the range of about 0.2 to 10 hours.

Following the treatment with the formaldehyde compound, the product is contacted with a dry, oxygen-containing gas such as air, generally at a temperature no higher than that used with the treating agent and not less than about 300° C., for a time of at least about 0.5 hour, generally about 1 hour to about 20 hours, to complete the catalyst activation process. The product is then recovered and stored under dry air or dry nitrogen for later use.

In a specific embodiment, the invention catalyst activation process can include heating, in an activator, an unactivated fluidized silica-supported chromium polymerization catalyst under a nonoxidizing gas stream such as nitrogen to a temperature of about 595° C.; adding to the nitrogen stream, upstream from the heated activator, the gasified product of heating paraformaldehyde to 165° C. or higher; cooling the fluidized catalyst under nitrogen to a temperature of about 400° to 595° C.; and contacting the catalyst under fluidizing conditions with an oxygen-containing gas for 1-2 hours at the reduced temperature.

Under the described conditions for treating the polymerization catalysts with paraformaldehyde, it is assumed that at least a portion of the treating agent is thermally decomposed to formaldehyde. The invention catalyst preparation method includes contacting of the catalyst with formaldehyde, the compounds structurally related to formaldehyde, as described above, and substances which are formed from these formaldehyde compounds at the elevated temperature present during treatment of the catalyst.

The catalyst of the invention is suitable for the production of normally solid ethylene homopolymer and copolymers, preferably in a particle-form process. Ethylene can be copolymerized with one or more aliphatic mono-1-olefins containing from 3 to about 10 carbon atoms and/or a conjugated diolefin containing from 4 to about 12 carbon atoms. In such polymers the ethylene content generally ranges from about 80 to about 100 mole percent. Examples of the polymers which can be produced include polyethylene, ethylene/1-butene copolymers, ethylene/1-hexene copolymers, ethylene/1,3-butadiene copolymers, ethylene/propylene copolymers, and ethylene/propylene/1,3-butadiene terpolymers. The polymers can be fabricated by conventional plastics processes such as blow molding and injection molding into useful articles such as film, bottles, fibers and pipe.

Polymerization using the invention catalyst can be conducted batchwise in a stirred reactor or continuously in a loop reactor or series of reactors. The monomer(s) can be polymerized by contact with the invention catalyst under particle-form, solution or gas phase conditions at temperatures ranging from about 20° to about 200° C. and pressures from about atmospheric to about 6.9 MPa (1000 psia) or higher.

It is preferred to conduct the polymerization under particle-form conditions to obtain polymer in the form of discrete, solid particles suspended in the reaction medium. This can be accomplished by conducting the polymerization in the presence of a dry inert hydrocarbon diluent such as isobutane, n-heptane, methylcyclohexane, or benzene at a reactor temperature within the range of about 60° to about 115° C. and a reactor pressure of about 1.7 to about 4.1 MPa (250 to 600 psia). The polymer can be recovered, treated with $CO_2$ or $H_2O$, for example, to deactivate residual catalyst, stabilized with an antioxidant such as butylated hydroxytoluene (BHT) and dried by conventional methods to obtain the final product. Hydrogen can be used in the reactor as known in the art to provide some control of the molecular weight of the polymer.

EXAMPLE I

Preparation of the Catalyst

A catalyst consisting of 2 weight percent chromium trioxide supported on a silica-titania cogel containing 2.5 weight percent titanium (about 4.21 weight percent titania) was prepared as generally disclosed in U.S. Pat. No. 3,887,494 which issued June 3, 1975 to R. E. Dietz, by adding aqueous sodium silicate to aqueous sulfuric acid containing titanyl sulfate at about 25° C. to a pH of about 6 to 6.5. The gel was aged 4 hours at 80°-85° C., washed with water to remove impurities, and dried by azeotrope distillation with ethyl acetate. Sufficient $CrO_3$ was added to the vessel prior to drying to provide the amount of chromium desired.

About 30 mL of the dried catalyst was charged to a quartz activator tube 48 mm in outer diameter. The tube, arranged for fluidization of the particulate catalyst, was enclosed in an electrically-heated furnace to provide a temperature increase of 3°-5° C. per minute. Gases, e.g. dry nitrogen or dry air, were supplied to the activator tube at about 42 standard liters per hour. In addition, a tube containing 4 g of commercially-obtained paraformaldehyde reported to contain less than about 1 weight percent water was prepared for heating above the decomposition temperature of paraformaldehyde, i.e. about 182°-245° C., with gaseous products passed to the activator tube. The calculated mole ratio of silica to formaldehyde, assuming complete conversion of paraformaldehyde to formaldehyde, was about 0.85:1.

The activation procedure consisted of heating the catalyst to 593° C., maintaining this temperature for 2 hours 35 minutes, and then contacting the fluidized catalyst at 593° C. with the vaporized 4 g charge of paraformaldehyde thermal decomposition products over about a 25-minute period. Then air was substituted for the nitrogen gas and fluidization was continued for 2 more hours at 593° C. Heating was then discontinued and the cooled product was removed and stored under dry air in a closed container for later use.

About 30 mL of a control catalyst was activated by heating in the activator tube at 593° C. for 4 hours using 42 standard L of dry air per hour. The activated material was recovered and stored in the same manner as the invention catalyst.

EXAMPLE II

Polymerization of Ethylene

Ethylene polymerization was carried out using samples of each catalyst by contacting the catalyst with ethylene under particle form polymerization conditions in about 1.25 lbs (567 g) of isobutane diluent in a stirred, stainless steel reactor. Polymerization conditions included a reactor temperature of 107° C. or 110° C. and a total reactor pressure of about 565 psia (3.89 MPa). Ethylene was supplied to the reactor on demand from a pressurized reservoir to maintain the pressure throughout a run. Polymerization was continued for a time estimated to give catalyst productivities of about 5000 g polymer per gram catalyst at a reactor temperature of 110° C. and about 3000 g of polymer per gram catalyst at 107° C. Each run was terminated by discontinuing ethylene flow, stopping any heating, and venting ethylene and isobutane from the reactor. Polymer was recovered and dried in a vacuum oven, and its melt index (MI) and high load melt index (HLMI) values in terms of g/10 minutes were determined according to ASTM D 1238-65T, condition E and condition F, respectively.

The HLMI/MI ratio is considered to provide a measure of the molecular weight distribution for a given polymer. The larger this ratio, the broader the polymer molecular weight distribution.

The reactor temperatures employed, run times used and results obtained are shown in Table I.

TABLE I

| | | | Ethylene Polymerization | | | | | |
|---|---|---|---|---|---|---|---|---|
| Run | Catalyst Weight (g) | Reactor Temp. °C. | Induction Time (Min) | Polymerization Time (Min) | Productivity (g/g) | HLMI | MI | HLMI/MI |
| 1 (Invention) | 0.0530 | 110 | 63 | 140 | 5190 | 46 | 1.0 | 46 |
| 2 (Control) | 0.0460 | 110 | 83 | 150 | 5545 | 19 | 0.39 | 48 |
| 3 (Invention) | 0.0780 | 107 | 15 | 48 | 3050 | 51 | 1.1 | 46 |

In comparing invention run 1 with control run 2, it is apparent that the invention formaldehyde-treated catalyst had a melt index capability more than double that of the control. The reduction in the induction period noted for the invention catalyst used in run 1 compared to the control of run 2 also suggests that it would be used more effectively than the control in a continuous polymerization process under steady state condition in which catalyst is periodically introduced and polymerization effluent is periodically withdrawn.

That which is claimed is:

1. A process for preparing a polymer which comprises contacting, in an inert hydrocarbon diluent at a temperature of from about 60° to about 115° C. and a pressure of from about 1.7 to about 4.1 MPa, a monomer comprising ethylene and a chromium oxide polymerization catalyst prepared by a process comprising the steps of:

(a) heating a catalyst comprising silica-supported chromium in a nonoxidizing atmosphere in the presence of a treating agent selected from formaldehyde and substances thermally decomposable to formaldehyde and (b) heating the thus-treated catalyst in an oxidizing atmosphere.

2. The process of claim 1 wherein step (a) of the catalyst preparation process is carried out at a temperature of at least about 250° C. and step (b) is carried out at a temperature of at least about 300° C. for at least about 0.5 hour.

3. The process of claim 2 wherein the chromium treated in step (a) is present in the form of a compound selected from the group consisting of chromium oxide and compounds convertible to chromium oxide.

4. The process of claim 3 wherein the treating agent comprises paraformaldehyde.

5. The process of claim 4 wherein the nonoxidizing atmosphere in nitrogen.

6. The process of claim 3 wherein step (a) is carried out at a temperature within the range of about 300° to about 600° C.

7. The process of claim 6 wherein the treating agent is paraformaldehyde.

8. The process of claim 7 wherein step (b) is carried out at a temperature in the range of about 500° to about 595° C.

9. The process of claim 3 wherein the silica-supported chromium further comprises titanium.

10. The process of claim 9 wherein the silica support is a silica-titania cogel containing from about 0.1 to about 20 weight percent titanium, based on the weight of the polymerization catalyst.

11. The process of claim 1 in which the inert hydrocarbon diluent is isobutane.

12. The process of claim 1 in which the monomer comprises ethylene and 1-hexene.

13. A process for preparing a polymer which comprises contacting, in an inert hydrocarbon diluent at a temperature of from about 60° to about 117° C. and a pressure of from about 1.7 to about 4.1 MPa, ethylene monomer and a chromium oxide polymerization catalyst activated by a process comprising the steps of:

(a) fluidizing an unactivated silica-supported chromium catalyst in a nonoxidizing gas stream;

(b) heating the fluidized to a temperature of at least about 250° C. for at least about 0.2 hour;

(c) adding to the nonoxidizing gas stream, upstream from the activator, a treating agent comprising the products of heating paraformaldehyde to a temperature of at least 165° C., and allowing the treating agent to flow in contact with the fluidized catalyst;

(d) cooling the fluidized catalyst to a temperature within the range of about 400° C. to about 500° C.; and (e) fluidizing the thus-treated catalyst in an oxygen-containing gas for at least about 0.5 hour at a temperature within the range of about 400° C. to about 500° C.

14. The process of claim 13 wherein the temperature of heating step (b) is within the range of about 400° C. to about 595° C.

15. The process of claim 13 in which the nonoxidizing gas is nitrogen and the oxidizing gas is air.

16. The process of claim 13 in which the inert hydrocarbon diluent is isobutane.

17. The process of claim 13 in which the monomer comprises ethylene and 1-hexene.

18. The process of claim 13 in which the monomer comprises ethylene and 1-butene.

* * * * *